United States Patent Office 3,005,724
Patented Oct. 24, 1961

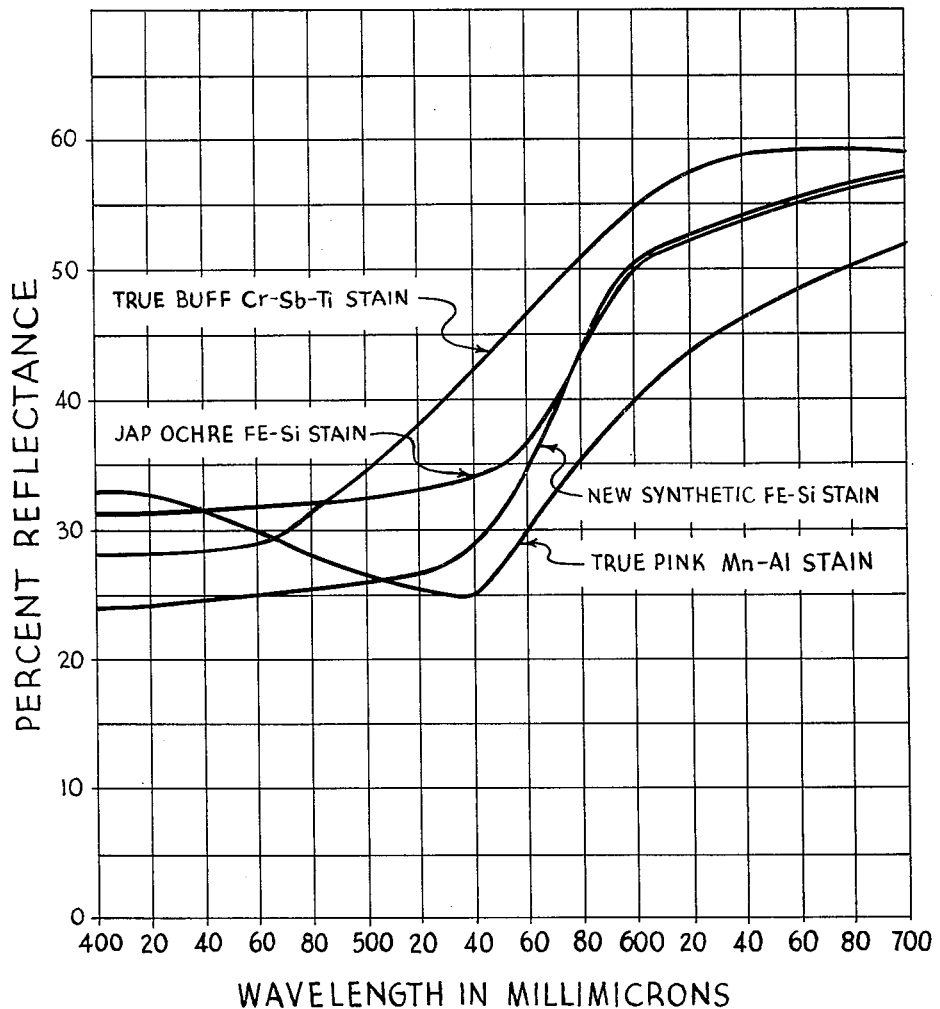

3,005,724
IRON-SILICA CERAMIC STAIN
Clarence A. Seabright, Lakewood, Ohio, assignor to The Harshaw Chemical Company, Cleveland, Ohio, a corporation of Ohio
Filed Feb. 16, 1959, Ser. No. 793,438
7 Claims. (Cl. 106—304)

This invention relates to ceramic pigments of the type known as body stains, and specifically to iron oxide-silica stains which are capable of developing in ceramic bodies yellow-pink or salmon-pink to deep brown-red colorations.

Synthetic and naturally occurring iron oxide-silica pigments are known, the naturally occurring product being known as Jap ochre. Jap ochre, however, has never been fully satisfactory due to variations in composition and color from one shipment to the next. Efforts to synthesize Jap ochre have succeeded but have not been found to be commercially feasible due to high costs involved in the process. Jap ochre has formerly been synthesized by a process wherein a gel is formed by reacting an inorganic water soluble ferric compound and an acid with a soluble alkali metal silicate, drying, washing, and then calcining. The washing operations of this process are responsible for the high cost of producing the pigment. It has been found that the soluble alkali metal salts which are produced in this process are exceedingly difficult to remove from the pigment.

It is, therefore, the object of this invention to synthesize Jap ochre by a process which does not involve expensive washing operations.

Jap ochre contains approximately 6% to 13% of $Fe_2O_3$, from 0 to 2% of $Al_2O_3$ and remainder $SiO_2$ and impurities. The state of association of these constituent oxides is uncertain. Calcining a mechanical mixture thereof does not produce a pigment of the properties of Jap ochre even though very finely ground and very thoroughly mixed. It has been found that such a process does not produce a ceramic pigment of any value whatever, the color firing out almost immediately in ceramic bodies.

Previous workers have discovered that iron-silica pigments may be produced by a gel process. The gel process consists essentially of forming, drying and calcining gels capable upon dehydration of yielding compositions of the empirical formula $Fe_2O_3 \cdot xSiO_2$ where $x$ is of such value that the $Fe_2O_3$ content is approximately from 5% to 15% of the combined weight of $Fe_2O_3$ and $SiO_2$. The gels of the prior art are formed from a ferric salt, an acid and an alkali metal silicate which are brought together in an aqueous medium. The pigments which result from a gel process are superior to Jap ochre in color cleanness and firing characteristics as body or underglaze stains. The difficulty involved in washing out the soluble alkali metal salts formed in a process of the prior art, however, renders the process impractical from a commercial standpoint.

The present invention involves a gel process wherein expensive byproduct salt removal operations are not required. The former necessity of multiple washing operations for the removal of salts has been eliminated by the use of colloidal silica rather than an alkali metal silicate as a source of $SiO_2$. The colloidal silica is precipitated by means of ammonium hydroxide which results in the formation of by-product ammonium salts. The by-product ammonium salts, unlike the by-product alkali metal salts of the prior art, may be driven off by heat, and therefore are not dependent on washing operations for their removal. While a wash may be used to remove a large part of the ammonium salts, it has been found that an acceptable product may be produced by merely driving off the ammonium salts during drying and calcining operations. In any event, the degree of washing employed in the new process is exceedingly smaller than that employed in the removal of the alkali metal salts of the process of the prior art.

Colloidal silica dispersed in aqueous medium is available in several commercial forms, such as for instance, Ludox LS and Ludox HS. These products are very low in alkali content, the LS containing alkalies in the range of 0.1% and HS in the range of 0.3%. Colloidal silicas have a normal pH range of 8.5 to 10.5 and a $SiO_2$ content of from 20% to 35%. The higher concentrations of silica are more desirable in that they decrease the amount of water which must be removed from the precipitated product. The concentration of water, however, has no noticeable effect on the efficiency with which the colloidal silica may be precipitated. It has been found that electrolytes as well as a critical basic pH will cause gelation of colloidal silica, the rate of gelation, in the case of electrolytes, depending upon the electrolyte concentration and temperature.

The iron oxide-silica stain produced by the new process is chemically and in color substantially identical with the pigment produced by the gel process of the prior art. The color comparison of applicant's stain with other stains is illustrated in the accompanying drawing wherein the figure is a diagram upon which has been reproduced the curves traced by a Hardy recording spectrophotometer. The curve produced by the synthesized iron oxide-silica stain of the prior art has not been shown as this curve would essentially follow the curve produced by the synthesized iron oxide-silica stain of applicant's invention. By way of comparison, a buff stain showing high reflectance in the yellow area of the spectrum, a pink stain showing high reflectance in the blue area of the spectrum, and a flesh colored Jap ochre stain are included in the diagram. All curves were produced from ceramic tiles containing 1% stain.

The iron oxide-silica stain resultant from the new process has the following empirical formula: $Fe_2O_3 \cdot xSiO_2$, where $x$ may have a value from 15 to 50 or higher. These molecular proportions correspond to about 15% $Fe_2O_3$ down to about 5% $Fe_2O_3$ or less, percentages being based on combined weight of $Fe_2O_3$ and $SiO_2$. It is believed that a cristobalite crystal structure is formed or that iron oxide, or possibly ferric silicate is produced and is surrounded and protected by cristobalite. The iron oxide-silica stain may be regarded as a calcination product of the dried gels derived from associations of ferric oxide-silica and water. The state of association, whether physical or chemical, being at present undetermined.

The ratios of $Fe_2O_3$ to $SiO_2$ contained in the silica stain resultant from the present process have been found to be extremely flexible. The ratios producing the most desirable colors, however, are those wherein the stain contains from 5% to 15% $Fe_2O_3$ and the remainder $SiO_2$. It is in fact easy to produce compositions of even lower iron oxide content than 5%, however it is not usually desirable to do so since the color oxide per pound is thereby reduced, the pigment not being in any way improved. On the other hand, increasing the iron oxide content is difficult but very desirable since the color is thereby strengthened so long as the iron oxide and silica are associated in such a way that firing out does not occur when the pigment is employed as a body or underglaze stain. The upper limit I have found to be in the order of 15% $Fe_2O_3$. The preferred range is in the order of 8% to 13% $Fe_2O_3$.

In the preferred practice of the new gel process, the following steps are involved:

(1) A ferric salt and colloidal silica are brought together in aqueous medium, the proportions of ferric salt and colloidal silica being selected in accordance with the composition desired in the final product within the indicated limits. A portion of alkaline material removable by volatilization is then added so as to upwardly adjust the previously acidic pH to an alkaline pH above the precipitation point of the colloidal silica. The amount of water employed suitably is such that the weight of the reaction mixture is about 15 to 16 times the combined $Fe_2O_3$ and $SiO_2$ content thereof in the case of 15% $Fe_2O_3$ pigment. For a lower iron content pigment the amount of water may be reduced, that is the weight of the reaction mixture may be reduced to ten times the combined weight of $Fe_2O_3$ and $SiO_2$ in the case of an 8% $Fe_2O_3$ pigment.

(2) The gel is dried. Drying may be accomplished at room temperature or at elevated temperatures preferably not exceeding 250° C. On drying the gel is greatly reduced in volume, for example, to the order of one-tenth its original volume.

(3) The dried gel is broken up and calcined in an oxidizing atmosphere at from 900° C. to 1400° C. The temperature may be brought to the indicated range in a period of about three to four hours or longer, if desired, and held within that range from 1 to 3 hours.

(4) The calcined product is wet ball milled, dried and hammer milled.

(5) A light wash may be carried out subsequent to the initial drying of the precipitate. Such wash, however, is optional and has not been found to be essential to the preparation of an acceptable stain.

The following specific examples will serve to illustrate the invention:

*Example I*

Ferrous ammonium sulfate—24.5 grams is dissolved in 100 cc. tap water. Hydrogen peroxide 30%—8 cc. is then added with stirring to oxidize the iron to ferric state. Ludox LS—124 cc. is then added and mixed well. A dilute solution of ammonium hydroxide is then added till the mix is alkaline. This results in formation of a thick red-brown gel-like precipitate.

This precipitate is dried and broken up. It is then washed once to remove most of the soluble ammonium sulfate and some soluble iron. It is redried and calcined to about 1150° C. The calcine is wet ball milled, dried, and hammer milled.

*Example II*

Ferrous sulfate—69.6 grams is dissolved in 400 cc. of water. 24 cc. of concentrated $H_2SO_4$ is then added to the ferrous sulfate solution. 16 cc. of 30% $H_2O_2$ is added within constant stirring. Ludox HS—496 cc. is added next and mixed well. A dilute solution of ammonium hydroxide is then added till the mix is alkaline, thereby forming a thick red-brown gel-like precipitate. It is essential that the ferrous sulfate be mixed with the colloidal silica prior to the addition of ammonium hydroxide in order to produce an acceptable stain.

The precipitate is dried, broken up and calcined at 1100° C. The calcine is wet ball milled, dried and hammer milled.

It is to be understood that the invention is operative with many other oxidizable ferrous salts and ferric salts in addition to the several examples given.

Having thus described my invention, what I claim is:

1. A process for forming an iron-silica ceramic stain including the steps of bringing together in aqueous medium an inorganic, water soluble ferric salt and colloidal silica in amounts such that the weight of the aqueous ferric-silica mixture is from about 10 to about 16 times the combined weight of the resultant $Fe_2O_3$ and $SiO_2$, adjusting the pH upwardly by means of ammonium hydroxide until the mixture sets up to a gel, the proportions of ferric salt and colloidal silica corresponding to an empirical formula of $Fe_2O_3.xSiO_2$, where $x$ is of such value that in the final product the weight of $Fe_2O_3$ is from 5% to 15% of the combined weights of $Fe_2O_3$ and $SiO_2$, drying and calcining at a temperature of from 900° C. to 1400° C.

2. A process according to claim 1 wherein the gel is washed subsequent to the drying operation and prior to the calcining operation.

3. A process for forming a ceramic stain comprising bringing together in aqueous medium a water soluble inorganic ferric ammonium salt and colloidal silica in amounts such that the weight of the aqueous ferric-silica mixture is from about 10 to about 16 times the combined weight of the resultant $Fe_2O_3$ and $SiO_2$, adjusting the pH upwardly by means of ammonium hydroxide until the mixture sets up to a gel, drying said gel, washing and calcining at a temperature from 900° C. to 1400° C., the proportions of ferric salt and colloidal silica corresponding to an empirical formula of $Fe_2O_3.xSiO_2$, where $x$ is of such value that in the final product the weight of $Fe_2O_3$ is from 5% to 15% of the combined weights of $Fe_2O_3$ and $SiO_2$.

4. A process for forming a ceramic stain comprising bringing together in aqueous medium water soluble inorganic ferric salt and colloidal silica in amounts such that the weight of the aqueous ferric-silica mixture is from about 10 to about 16 times the combined weight of the resultant $Fe_2O_3$ and $SiO_2$, adjusting the pH upwardly by means of ammonium hydroxide until the mixture sets up to a gel, drying said gel, washing and calcining at a temperature from 1100° C. to 1200° C., the proportions of ferric salt and colloidal silica corresponding to an empirical formula of $Fe_2O_3.xSiO_2$, where $x$ is of such value that in the final product the weight of $Fe_2O_3$ is from 8% to 13% of the combined weights of $Fe_2O_3$ and $SiO_2$.

5. A process for forming an iron-silica ceramic stain including the steps of bringing together in aqueous medium a water soluble inorganic ferric salt and a 20% to 35% aqueous colloidal solution of a hydrated silica in amounts such that the weight of the aqueous ferric-silica mixture is from about 10 to about 16 times the combined weight of the resultant $Fe_2O_3$ and $SiO_2$, adjusting the pH upwardly by means of ammonium hydroxide until the mixture sets up to a gel, drying said gel, washing and calcining at a temperature from 900° C. to 1400° C., the proportions of ferric salt and colloidal silica corresponding to an empirical formula of $Fe_2O_3.xSiO_2$, where $x$ is of such value that in the final product the weight of $Fe_2O_3$ is from 5% to 15% of the combined weights of $Fe_2O_3$ and $SiO_2$.

6. A process for forming an iron-silica ceramic stain including the steps of forming a gel by mixing ferric ammonium sulfate and colloidal silica in aqueous medium in amounts such that the weight of the aqueous ferric-silica mixture is from about 10 to about 16 times the combined weight of the resultant $Fe_2O_3$ and $SiO_2$, adjusting the pH upwardly by means of ammonium hydroxide until the mixture sets up to a gel, drying said gel, washing and calcining at a temperature from 900° C. to 1400° C., the proportions of ferric salt and colloidal silica corresponding to an empirical formula of $Fe_2O_3.xSiO_2$, where $x$ is of such value that in the final product the weight of $Fe_2O_3$ is from 5% to 15% of the combined weights of $Fe_2O_3$ and $SiO_2$.

7. A process for forming an iron-silica ceramic stain including the steps of mixing ferrous sulfate, hydrogen peroxide and colloidal silica in aqueous medium in amounts such that the weight of the aqueous ferric-silica mixture is from about 10 to about 16 times the combined weight of the resultant $Fe_2O_3$ and $SiO_2$, then adjusting the pH upwardly by means of ammonium hydroxide until the mixture sets up to a gel, drying the resulting gel, washing and calcining at a temperature from 900° C. to 1400° C., the proportions of ferrous salt and colloidal silica corresponding to an empirical formula of $Fe_2O_3.xSiO_2$, where $x$ is of such value that in the final product the weight of $Fe_2O_3$ is from 5% to 15% of the combined weights of $Fe_2O_3$ and $SiO_2$.

References Cited in the file of this patent

UNITED STATES PATENTS

| | | |
|---|---|---|
| 1,541,478 | Carver | June 9, 1925 |
| 2,347,630 | Harbert | Apr. 25, 1944 |
| 2,856,302 | Reuter | Oct. 14, 1958 |